United States Patent [19]
Beucci

[11] 4,287,411
[45] Sep. 1, 1981

[54] APPARATUS FOR SEEKING AND FOLLOWING A LUMINOUS ZONE, SUCH AS THE SUN

[75] Inventor: Marcello Beucci, Arezzo, Italy

[73] Assignee: Gori & Zucchi S.p.A., Italy

[21] Appl. No.: 50,115

[22] Filed: Jun. 19, 1979

[30] Foreign Application Priority Data

Sep. 1, 1978 [IT] Italy .................. 9576 A/78

[51] Int. Cl.³ .............................................. G01J 1/20
[52] U.S. Cl. .............................. 250/203 R; 126/425
[58] Field of Search ............... 250/203 R, 209, 578; 356/141, 152; 126/424, 425

[56] References Cited

U.S. PATENT DOCUMENTS

| | | | |
|---|---|---|---|
| 3,268,185 | 8/1966 | Eckermann | 250/203 |
| 3,917,942 | 11/1975 | McCay | 250/203 |
| 4,146,784 | 3/1979 | Yekutiey | 250/203 |
| 4,146,785 | 3/1979 | Neale | 250/209 |
| 4,151,408 | 4/1979 | Brown et al. | 250/203 |

Primary Examiner—David C. Nelms
Attorney, Agent, or Firm—McGlew and Tuttle

[57] ABSTRACT

Apparatus for seeking and following a luminous zone, such as the sun, comprises an element angularly movable about mutually perpendicular axes. The element carries photoelectric transducers facing in different directions and which control servomotors for positioning the element to face the luminous zone in accordance with differential signals produced by the transducers.

5 Claims, 7 Drawing Figures

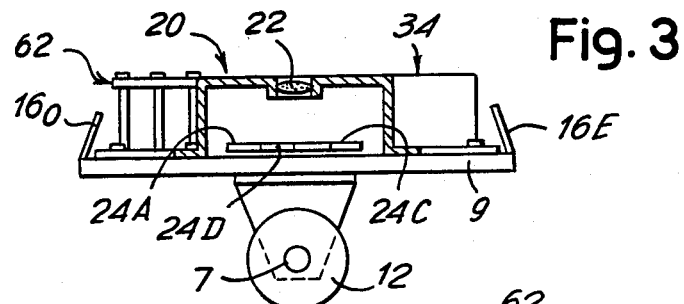
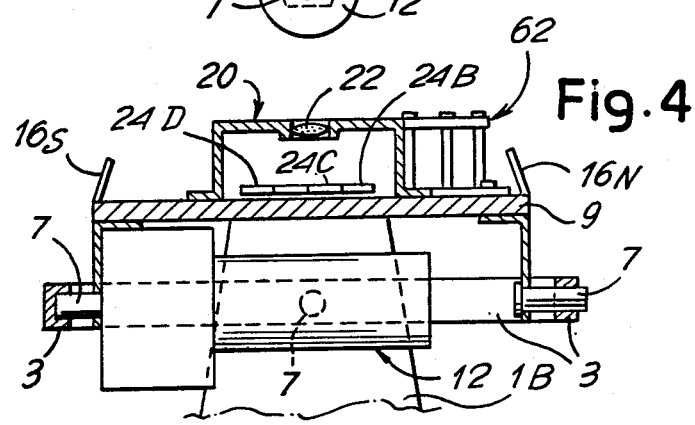
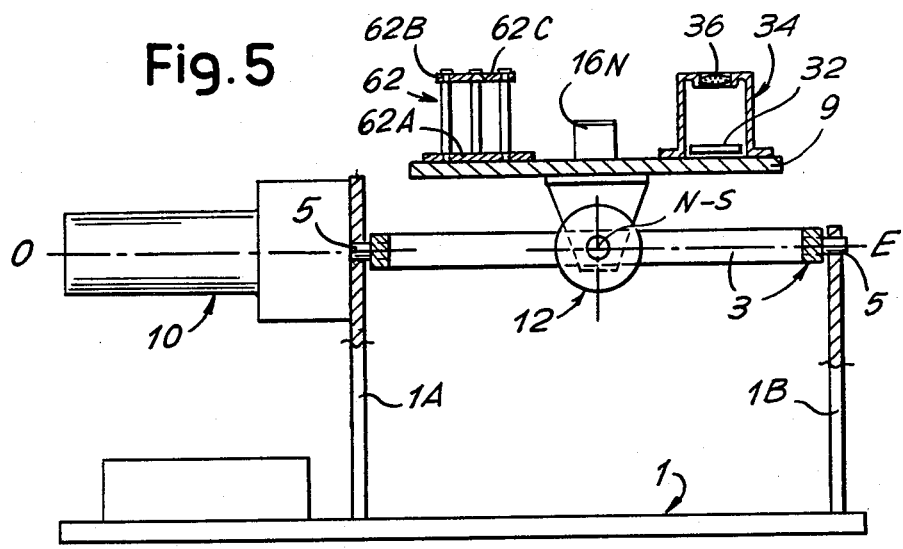

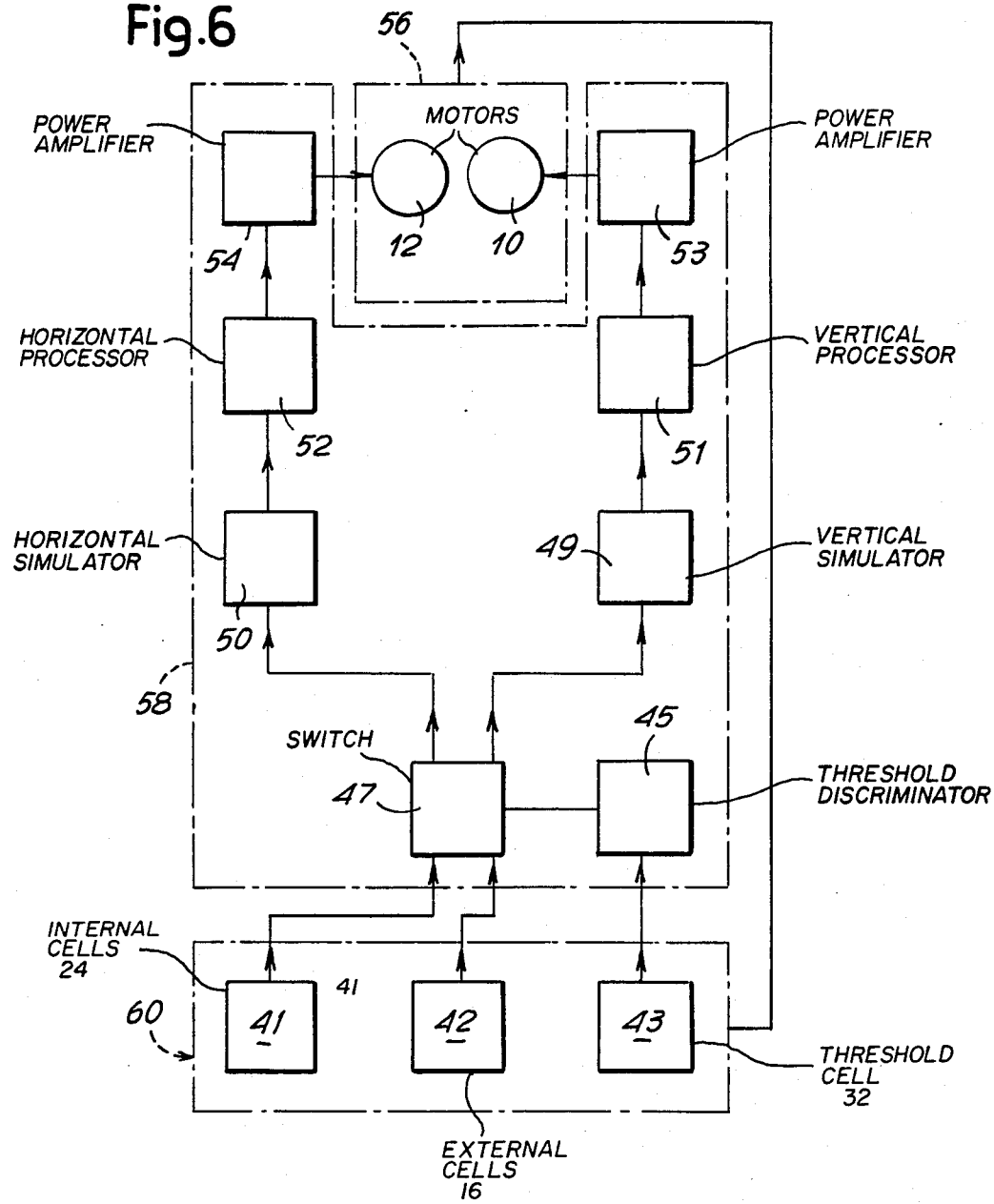

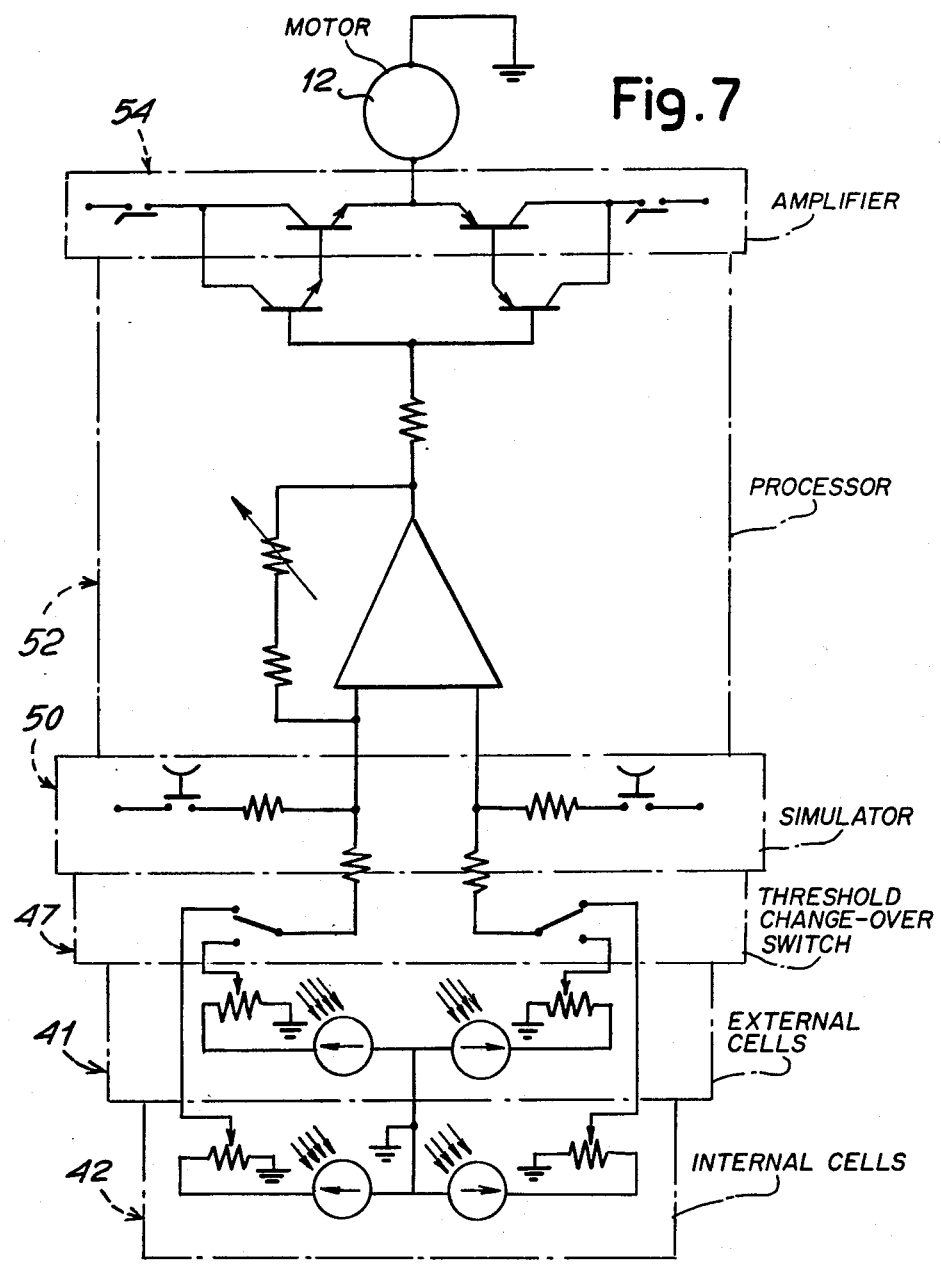

APPARATUS FOR SEEKING AND FOLLOWING A LUMINOUS ZONE, SUCH AS THE SUN

BACKGROUND OF THE INVENTION

1. Field of the Invention

The present invention relates to an apparatus for seeking a luminous zone, and more particularly, but not exclusively to an apparatus for seeking and following a moving light source such as the sun.

2. Description of the Prior Art

There has been proposed apparatus for following the movement of the sun, for example, for controlling movement of solar energy devices, which operates on the basis of a timing mechanism which effects movement in accordance with the theoretical movement of the sun throughout the day. Such apparatus must, however, be accurately positioned at the outset and must be calibrated in accordance with the locality in which it is to operate. The apparatus always follows the theoretical path of the sun, independently of whether or not it is obscured by a cloud. To effect evening-morning turnaround, a timer acts at the end of the day to return the apparatus into a position to face the sunrise on the following day. If the sun is obscured by cloud, the apparatus will still follow it, whereas it can happen that the zone of greatest luminosity and consequently greatest energy is on the other side of the sky, and in such case the maximum available energy will not be picked up.

SUMMARY OF THE INVENTION

According to the invention there is provided apparatus for seeking a luminous zone, comprising an angularly movable element, photoelectric transducer means for generating signals for orientating the element towards the luminous zone, said transducer means comprising at least two first transducers facing in different directions and symmetrically disposed about a plane containing the axis of angular movement of the element, and servomotor means for moving the element about said axis, said servomotor means being controlled by the signals generated by the transducers.

BRIEF DESCRIPTION OF THE DRAWINGS

An embodiment of the invention will now be described, by way of example only, with reference to the accompanying diagrammatic drawings, in which:

FIGS. 3 and 4 are two mutually perpendicular sections of the apparatus;

FIG. 5 is a section through the apparatus, but in a different plane to FIGS. 3 and 4; and FIGS. 6 and 7 are, respectively, an electrical block diagram and a more detailed electrical circuit diagram of the apparatus.

DESCRIPTION OF THE PREFERRED EMBODIMENTS

Figure 1:
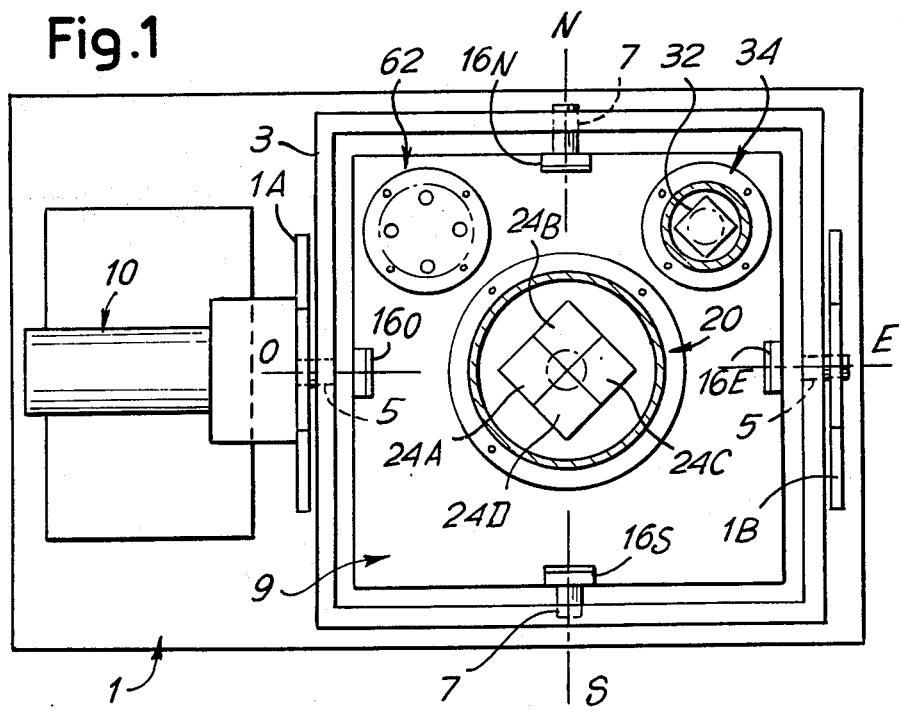
FIG. 1 is a plan view, partly in section, of apparatus in accordance with the invention.

The apparatus shown in the accompanying drawings comprises a fixed support structure 1 having upstanding flange-like supports 1A, 1B on which is mounted a first movable element in the form of a frame 3, which can swing about an axis E-O defined by a pair of pivots 5. A second movable element 9 is pivotally mounted by pivots 7 on the frame 3 along an axis N-S perpendicular to the axis E-O, the axes E-O, and N-S lying in the same plane. Consequently, the movable element 9 can make angular movements substantially about the point of intersection of the two axes N-S and E-O. In one special demonstrative position which aids explanation, but is not limiting, the E-O axis can be considered as being positioned along the east-west direction, and thus the N-S axis is positioned in a vertical plane along the north-south direction. The angular movements of the frame 3 about the E-O axis can be effected by a geared control motor 10 rigidly connected to the support 1A to move the frame 3 about the axis E-O, whereas a second geared motor 12 serves for moving the element 9 about the N-S axis, the geared motor 12 being rigidly connected for example to the frame 9, with its shaft forming one of the pivots 7 rotatably connected to the frame 3.

The movable element 9 shown in the drawing is in the form of a rectangular, and in particular square, plate, the bisectors of the sides of the plate corresponding to the axes E-O and N-S. Four external photoelectric cells, $16_O$, $16_E$, $16_N$ and $16_S$ are disposed along the sides of the plate 9, and in such a manner as to lie at the four cardinal points, namely, east, west, north and south. The excitation or light-sensitive surfaces of the cells are inclined inwardly and upwardly with an inclination of about 70° to the plane of the plate 9.

Figure 2:
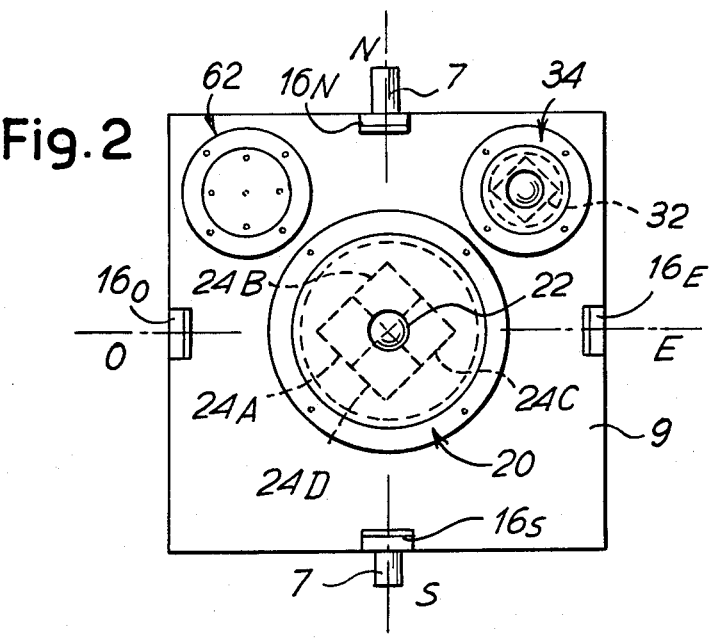
FIG. 2 is a plan view of a movable element of the apparatus.

At the center portion of the plate 9 there is disposed a cup member 20 with its opening facing the plate, the base of the cup member being provided with a bore which receives an optical system schematically shown at 22 for concentrating a beam of parallel rays which can penetrate through it from the outside and into the cavity of the cup member 20. Four further photoelectric cells 24A, 24B, 24C, 24D are disposed inside the cup member 20 and in particular on the plate 9, their excitation or light-sensitive surfaces being square as shown on the drawing. The cells 24A, 24B, 24C, 24D are positioned in juxtaposed relation along two lines which extend along the diagonals of the plate 9 and are thus at 45° to the lines along which the axes E-O and N-S and the cells 16 are disposed. Each cell 24 is symmetrical about the axis N-S or E-O as is clearly shown in FIGS. 1 and 2. Although, as shown, the cells 24 are coplanar, they need not necessarily be coplanar.

The foregoing arrangement is such that over a very wide angular field of the order of 180°, a beam of light energy may be received by one or more than one of the external cells 16, so that by comparing the energy received by the respective external cells 16, it is possible to make an evaluation of the direction of origin of the beam. When the plate 9 is aimed generally towards the direction of origin of the energy, a concentrated beam of rays from the system 22 can strike one or more of the internal cells 24 simultaneously. A comparison between the quantity of energy falling on the various internal photoelectric cells 24, and particularly on the cells of each pair of aligned cells, allows the inclination at which the beam of incident rays strikes the optical system 22 to be determined accurately. If the beam is perpendicular to the light sensitive surfaces of the cells 24, then the excitation of the four cells 24 is in perfect balance. Because the adjoining edges of the cells 24 are inclined at 45° to the axes E-O and N-S any inclination in the direction of one of the axes E-O and N-S from the center of the plate 9 leads to a strong inbalance in excitation, and thus a large difference between the energy fractions which strike the two cells aligned in the direction of the axis considered. Consequently, signals deriving from a comparison between the energy received by the various cells 24 are proportionally very high, which permits good sensitivity and accuracy.

The external cells 16 allow the direction of origin of the source to be found over a large area, whereas the internal cells 24 allow accurate aiming after the general search and positioning operation obtained by the external cells. A switch-over system is advantageously provided between an external cell activity stage and an internal cell activity stage, in accordance with the conditions determined in all or some of the cells of one or the other group, or in one specific cell, by means of a change-over, i.e. switching system. The operation of an electrical part of the apparatus for effecting the aforesaid switching is described hereinafter.

As shown in the drawing, the switching system is provided on the plate 9 and comprises a photoelectric cell 32 housed inside a cup member 34 which comprises an optical system 36 for concentrating the rays on to the cell 32. When the signal obtained from the cell 32 is above a certain threshold level, this indicates that the plate 9 is positioned towards the most luminous zone, and this signal can be used to switch-over from operation with the cells 16 to operation with the cells 24, this being preferable when the source is the unobscured sun. In this respect, the cells 24 enable the sun to be followed much more precisely than the cells 16. In contrast, the cells 16 enable the most luminous zone to be reliably sought, even with the sun obscured (i.e. covered by cloud) and also allow an evening-morning turnaround, i.e. a movement from the direction of the final position of the setting sun to the direction of the initial position of the rising sun, which positions are almost diametrically opposed.

FIGS. 6 and 7 are a block diagram and a circuit diagram. The reference numeral 41 indicates the group of internal cells 24, 42 indicates the group of external cells 16, and 43 the threshold cell 32. The block 45 is a threshold discriminator controlled by the block 43 (the cell 32) and operative to cause a change-over switch 47 to switch over between the cell group 41 (the cells 24) and the cell group 42 (the cells 16). The reference numerals 49 and 50 indicate two blocks constituting a vertical simulator and a horizontal simulator for the north-south and east-west directions respectively.

FIG. 6 shows the components of the electrical circuit. The reference numerals 51 and 52 indicate two vertical and horizontal processing blocks connected to the blocks 49 and 50 respectively. The components of the block 52 are shown in FIG. 7. The reference numeral 53 and 54 indicate power amplifiers, of which the amplifier 54 is also shown in FIG. 7. The two amplifiers 53 and 54 respectively control the motor 10 and motor 12 of an actuator system, for effecting movement, indicated generally by 56 in FIG. 6. In this figure the electrical components are broadly designated by 58, and the photoelectric cells by 60.

The apparatus also comprises a device 62 for controlling the accuracy of aiming. The device 62 can, for example, comprise a disc 62A with a series of concentric circumferences, and a disc 62B with a central bore coaxial with the concentric circumferences, to allow aiming to be controlled, in the presence of the light source, by the relationship between the position of the illuminated zone on the disc 62A and the circumferences.

As already indicated, the block 41, comprising the four photoelectric cells 24, serves for positioning the plate 9 and for keeping it aimed towards a concentrated light source (for example the sun or a light produced by a lamp which follows some movement in space). The signals which control the movements of the plate 9 are generated by the potential difference emitted by two opposing cells illuminated differently. For example, it will be supposed that initially the plate 9 is not perfectly perpendicular to the light beam, but is displaced through a few degrees towards the west position. Under these conditions, after the concentrated light beam has passed through the lens 22, it strikes the cell 24A which generates a potential difference greater than that generated by the cell 24C. The difference between these two potentials generates an unbalance voltage which is increases as the plate displacement increases from a position perpendicular to the beam. This differential signal is suitably processed, and then controls the motor 10 to pivot the plate 9 until the light beam is in a position such that there is a zero signal differential between the cells 24A and 24C. When such a condition is reached, the movable plate 9 is perfectly perpendicular to the solar rays. The aforesaid also applies to the operation of the motor 12, which is controlled by the cells 24B and 24D, to move the plate in the north-south direction.

The block 42, composed of the four photoelectric cells 16, serves also for positioning the plate 9, and keeping it aimed, towards a source of diffused light, such as the most luminous zone of the sky when the sun is obscured. The operation of these four cells is identical to that described for the cells 24, when control is transferred to the cells 16. The block 43 is composed of the photoelectric cell 32, and generates a potential difference proportional to the light intensity which strikes it. Its signal is processed by the block 45. The block 45 processes the signals originating from the block 43, and sets the threshold change-over switch (block 47) according to the quantity of light striking the cell 32, the threshold value being adjustable. The purpose of the block 47 is to select either the block 41 or the block 42, according to whether the light is concentrated or diffused, or according to the aiming condition. The purpose of the blocks 49 and 50 is to manually simulate the unbalance in the light source by means of pushbuttons. The purpose of the blocks 51 and 52 is to convert the differential signals from the blocks 41 and 42 into necessary and sufficient signals for controlling the blocks 53 and 54, which amplify the signals and control the two motors 10 and 12.

Considering for example the sun as the light source, the operation when the sun is obscured is as follows:

The apparatus is controlled by the four external cells 16, which as already explained, position the plate 9 towards the most luminous zone in the sky. In this situation, the cell 32 receives a light intensity less than the set threshold intensity, and by means of the discriminator block 45 controls the block 47 which activates the block 42.

In operation with the sun uncovered, it will be assumed that initially the plate 9 is not aimed perfectly towards the sun, and thus the cell 32 does not receive the concentrated solar light.

In this case, the external cells 16 of the block 42 are activated, and these cause the plate to be positioned towards the sun. During the positioning motion, the cell 32 will at a certain point be struck by the concentrated rays from the lens 36, and will provide a signal to the discriminator block 45, which by way of the block 47 will activate the internal cells 24 of the block 41. This switching-over to the cells 24 allows the sun to be followed with much greater accuracy than with the cells 16.

The four external cells 16 return the plate to face the most luminous zone when the sun rises, and as soon as the sun appears, the cell 32 causes change-over so that the apparatus becomes under the control of the cells 24.

The drawings show only one embodiment given merely as a practical example of the invention, and modifications can be made thereto for example as regard to specific shapes and arrangements, within the scope of the claims.

The apparatus described has numerous applications, of which the following are examples:

It can directly control a plate carrying photoelectric panels;

It can remotely control a series of solar water panels or panels comprising photoelectric cells, via servotransmitters and receivers, or by means of mechanical transmissions;

It can be used to guide devices which study the sun (telecameras, telescopes, photographic cameras);

It can be used to control concentrating mirrors for solar boilers.

In summary, the apparatus comprising four photoelectric cells, a Wheatstone bridge and possibly a concentrating lens can be used for seeking and following any suitable light source or other luminous zone.

The apparatus particularly described always follows the most luminous zone in the sky, irrespective of whether this is the sun, the sun's rays through the clouds, or cloud layers reflecting more light. For the above reason, the evening-morning turnaround takes place automatically at dawn.

What is claimed is:

1. Apparatus for seeking a luminous zone, comprising an angularly movable element, photoelectric transducer means, mounted to said movable element, for generating signals for orientating the element towards the luminous zone, said transducer means comprising at least two first transducers facing in different directions and symmetrically disposed about a plane containing the axis of angular movement of the element, said first transducers having excitation surfaces inclined toward said plane, and servomotor means for moving the element about said axis, said servomotor means being controlled by the signals generated by the transducers.

2. Apparatus according to claim 1, wherein said transducer means further comprises a pair of second photoelectric transducers, a housing, said pair of second transducers being within the housing and being disposed in mutually adjacent relation symmetrically about said plane, optical means for concentrating light from said zone onto the second transducers, and means for switching-over between the first and second transducers such that the first transducers are activated to seek the approximate direction of said zone and the second transducers are activated to seek more accurately the direction of said zone.

3. Apparatus according to claim 1, wherein the said element is mounted for angular movement about two mutually perpendicular axes, said servomotor means comprising respective servomotors for moving the element about each of said axes, and said transducer means comprising two pairs of first transducers disposed symmetrically about respective planes containing the axes of angular movement, each said pair of first transducers being operative to control a respective one of the servomotors.

4. Apparatus according to claim 2, wherein the two pairs of second transducers are positioned symmetrically with respect to the axes of movement of the element, and the optical means is positioned with its optical axis perpendicular to a plane containing the axes of movement of the element.

5. Apparatus according to claim 1, further comprising a frame rotatable about a second axis lying in a second plane perpendicular to said first axis, and wherein said first movable element is mounted to said frame for rotation about said second axis, and wherein said transducer means further comprises a pair of second photoelectric transducers, a housing, said pair of second photoelectric transducers being within the housing and being disposed in mutually adjacent relation symmetrically about said first plane, optical means for concentrating light from said zone onto said second transducers, and means for switching over between the first and second transducers such that the first transducers are activated to seek the approximate direction of said zone and the second transducers are activated to seek more accurately the direction of said zone.

* * * * *